(12) United States Patent
Tatah et al.

(10) Patent No.: US 8,923,101 B1
(45) Date of Patent: Dec. 30, 2014

(54) MONOLITHICALLY INTEGRATED LASER DIODE AND POWER MONITOR

(71) Applicant: Seagate Technology LLC, Cupertino, CA (US)

(72) Inventors: Karim Tatah, Eden Prairie, MN (US); Michael Allen Seigler, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/029,052

(22) Filed: Sep. 17, 2013

(51) Int. Cl.
*G11B 11/00* (2006.01)

(52) U.S. Cl.
USPC .................................. 369/13.33; 369/53.26

(58) Field of Classification Search
None
See application file for complete search history.

(56) References Cited

U.S. PATENT DOCUMENTS

| | | | |
|---|---|---|---|
| 4,470,143 A | 9/1984 | Kitamura et al. | |
| 4,653,058 A | 3/1987 | Akiba et al. | |
| 4,674,100 A | 6/1987 | Kobayashi | |
| 4,771,434 A | 9/1988 | Yoshida et al. | |
| 4,815,090 A | 3/1989 | Usami et al. | |
| 4,947,400 A | 8/1990 | Dutta | |
| 5,258,991 A | 11/1993 | Peterson | |
| 5,665,985 A | 9/1997 | Iwata | |
| 5,757,837 A | 5/1998 | Lim et al. | |
| 5,822,351 A | 10/1998 | Kang | |
| 5,881,084 A | 3/1999 | Huang et al. | |
| 6,347,107 B1 | 2/2002 | Roddy et al. | |
| 7,085,300 B2 | 8/2006 | Werner et al. | |
| 7,286,581 B2 | 10/2007 | Coleman | |
| 7,804,875 B2 | 9/2010 | Park et al. | |
| 8,116,171 B1 | 2/2012 | Lee | |
| 8,149,653 B2 | 4/2012 | Shimazawa et al. | |
| 8,243,561 B2 | 8/2012 | Matsumoto | |
| 8,248,892 B2 | 8/2012 | Shimazawa et al. | |
| 8,248,897 B2 | 8/2012 | Shimazawa et al. | |
| 8,369,191 B2 | 2/2013 | Shimazawa | |
| 8,391,107 B2 | 3/2013 | Gage et al. | |
| 8,406,090 B2 | 3/2013 | Juang et al. | |
| 8,432,781 B2 | 4/2013 | Knappmann et al. | |

(Continued)

FOREIGN PATENT DOCUMENTS

EP 0405800 1/1991
EP 1833129 9/2007

OTHER PUBLICATIONS

Dec. 22, 2004, Behfar et al., "Horizontal Cavity Surface-Emitting Laser (HCSEL) Devices", Proceedings of SPIE, vol. 5737, Dec. 22, 2004, pp. 62-68.

(Continued)

*Primary Examiner* — Paul Huber
(74) *Attorney, Agent, or Firm* — Hollingsworth Davis, LLC

(57) ABSTRACT

An apparatus includes a slider body, a write element, and a laser chip. The write element is disposed on the slider body and is configured to apply a magnetic field to write data on a portion of a heat-assisted magnetic recording media in response to an energizing current. The laser chip has a laser diode with an active region configured to produce light. The laser diode adapted to inject the light to the proximate the read/write element. The laser chip additionally has a photodetector The photodetector is adapted to monitor light from the laser diode. The photodetector shares a same active region as the laser diode and the laser diode and photodetector are integrated together on the same laser chip.

20 Claims, 4 Drawing Sheets

(56) References Cited

U.S. PATENT DOCUMENTS

| | | |
|---|---|---|
| 2006/0039434 A1 | 2/2006 | Coleman |
| 2009/0196631 A1 | 8/2009 | Daghighian et al. |
| 2009/0225464 A1 | 9/2009 | Juang et al. |
| 2009/0266789 A1 | 10/2009 | Shimazawa et al. |
| 2009/0296256 A1* | 12/2009 | Tsuyama ................. 360/59 |
| 2011/0026377 A1 | 2/2011 | Shimazawa et al. |
| 2011/0122737 A1 | 5/2011 | Shimazawa et al. |
| 2011/0216635 A1 | 9/2011 | Matsumoto |
| 2011/0228651 A1 | 9/2011 | Gage et al. |
| 2011/0228652 A1 | 9/2011 | Gage et al. |
| 2011/0228653 A1 | 9/2011 | Shimazawa et al. |
| 2012/0008470 A1 | 1/2012 | Shimazawa et al. |
| 2012/0134246 A1 | 5/2012 | Shimazawa |
| 2012/0163137 A1 | 6/2012 | Wang et al. |
| 2012/0201107 A1 | 8/2012 | Peng et al. |
| 2012/0257488 A1 | 10/2012 | Knappmann et al. |
| 2013/0135975 A1 | 5/2013 | Gage et al. |

OTHER PUBLICATIONS

Aug. 2010, Black, "Optical Path Integration in Heat Assisted Magnetic Recording", Aug. 2010, 176 pages.

2006, Cubukcu et al., "Plasmonic Laser Antenna", Applied Physics Letters, 89, 2006, 093120-1-093120-3.

1998, Lim et al., "Optimization of VCSEL with an Integrated Resonant Photdetector", IEEE, 1998, 2 pages.

Oct. 1987, Matsueda, "AlGaAs OEIC Transmitters", Journal of Lightwave Technology, vol. LT-5, No. 10, Oct. 1987, pp. 1382-1390.

Jun. 1986, Nakano et al., "Monolithic Integration of Laser Diodes, Photomonitors, and Laser Driving and Monitoring Circuits on a Semi-Insulating GaAs", Journal of Lightwave Technology, vol. LT-4, No. 6, Jun. 1986, pp. 574-582.

\* cited by examiner

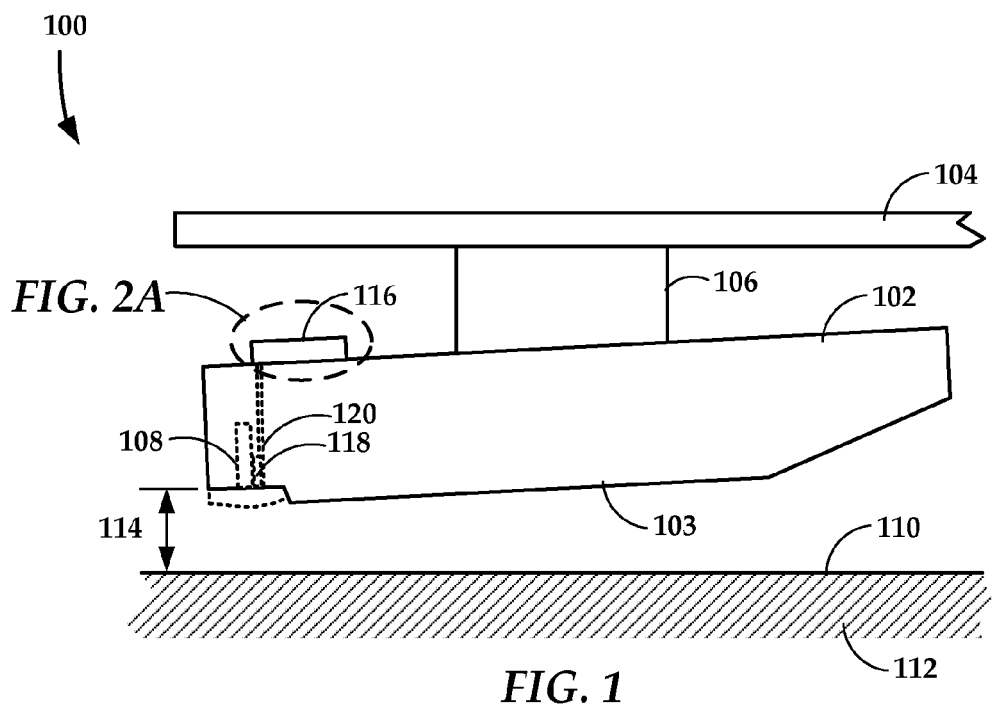

MONOLITHICALLY INTEGRATED LASER DIODE AND POWER MONITOR

SUMMARY

Examples described herein are directed to a monolithically integrated laser diode and photodetector apparatus and methods of use. The examples can be used with a heat-assisted magnetic recording device. In one embodiment, an apparatus includes a body, a write element, and a laser chip. The write element is disposed on the body and is configured to apply a magnetic field to write data on a portion of a heat-assisted magnetic recording media in response to an energizing current. The laser chip has a laser diode with an active region configured to produce light. The laser diode adapted to inject the light to the proximate the read/write element. The laser chip additionally has a photodetector. The photodetector is adapted to monitor light from the laser diode. The photodetector shares a same active region as the laser diode and the laser diode and photodetector are integrated together on the same laser chip.

In another embodiment, an apparatus includes a body, a write element, and a laser chip. The write element is disposed on the body and is configured to apply a magnetic field to write data on a portion of a heat-assisted magnetic recording media in response to an energizing current. The laser chip has segregated first and second contacts. The first contact is reverse biased as a detector and the second contact is forward biased as a laser diode. The detector is monolithically fabricated to have an active region that is continuous with an active region of the laser diode such that a first trench feature does not separate the active regions of the detector and laser diode.

In yet another embodiment a method is disclosed. The method includes providing a monolithically integrated laser chip having one contact reverse biased as a photodetector and a second contact forward biased as a laser diode, the photodetector having an active region that is continuous with an active region of the laser diode; generating laser light from the laser diode; coupling the laser light into an optical path having a distal end; directing a first portion of the laser light toward a near field transducer located at the distal end, the first portion of laser light exciting the near field transducer to surface plasmonic resonance; sensing the laser light to monitor an output power of the laser diode; and applying an energizing current to a write element to write data to a portion of a media.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 1 is a side view of a heat-assisted magnetic recording device with an integrated laser diode and photodetector according to an example embodiment;

DETAILED DESCRIPTION

Figure 2A:
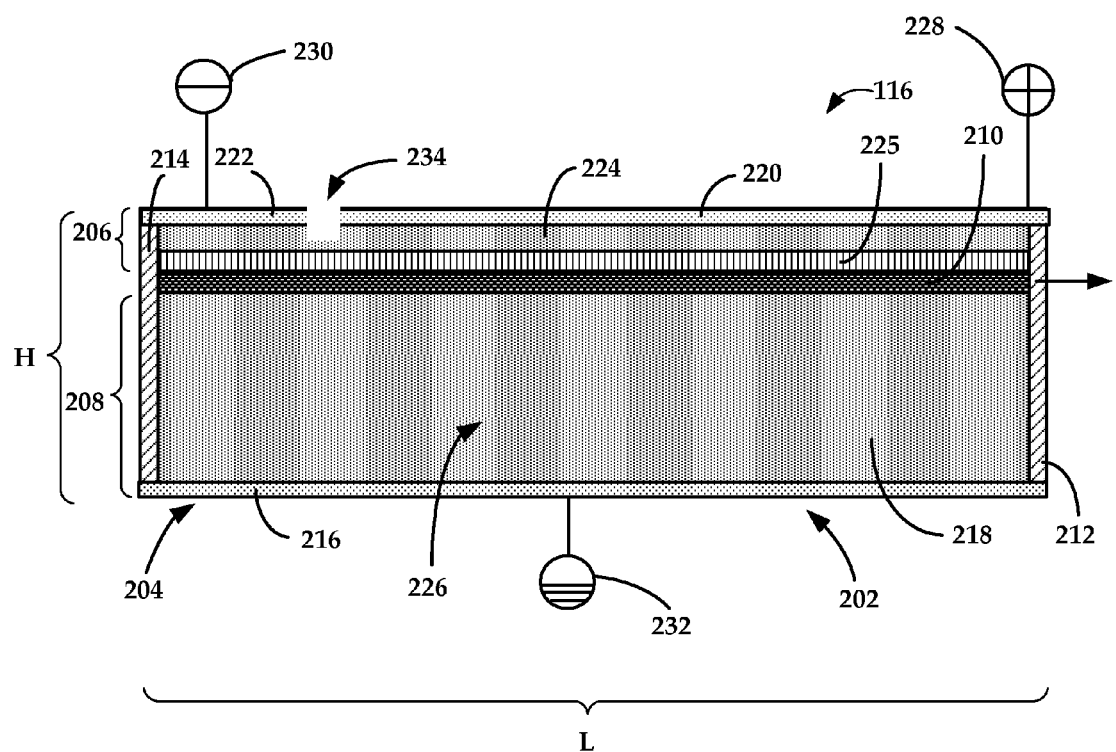
FIG. 2A is a cross-sectional view of a laser chip according to an exemplary embodiment.

This disclosure is related to the use of a laser chip with a shared active region for both a laser diode and a photodetector. Such a laser chip can be used in a heat-assisted magnetic recording (HAMR) device among other applications. In one embodiment, the laser chip has segregated first and second contacts with the first contact reverse biased as the photodetector and the second contact forward biased as a laser diode. In one embodiment, the laser chip has a first feature that separates the first contact from the second contact without extending into the shared active region of the photodetector and laser diode.

In HAMR devices, also sometimes referred to as thermal-assisted magnetic recording (TAMR) devices, a magnetic recording medium (e.g., hard drive disk) is able to overcome superparamagnetic effects that limit the areal data density of typical magnetic media. In a HAMR recording device, information bits are recorded on a storage layer at elevated temperatures. The heated area in the storage layer determines the data bit dimension, and linear recording density is determined by the magnetic transitions between the data bits.

It can be useful to monitor the power of a light source, e.g., laser diode, used with the HAMR recording device. Embodiments discussed herein provide for both lasing and power monitoring of a laser diode used in the HAMR recording device. Current light collection arrangements for power monitoring have led to inefficiencies as photodiodes are located a distance from the energy source on a submount or other structure. This disclosure discusses using a laser chip with a monolithically fabricated laser diode and photodetector to allow power monitoring to be conducted in closer proximity to the laser light. This can increase the power monitor's light collection efficiency and reduces the overall submount and head size.

In a number of existing HAMR designs, a laser chip for the laser diode is manufactured separately from the slider that houses the read/write head. The laser can be physically attached to the slider, or attached elsewhere and optically coupled to the slider (e.g., via an optic fiber). The exemplary embodiment described in FIG. 1 describes a configuration referred to herein as laser-on-slider (LOS) where the laser chip is physically attached to a submount and the submount is attached to the slider. However, other HAMR designs can utilize configurations where the laser chip is formed in or mounted directly on the slider in a configuration referred to as a laser-in-the-slider (LIS) or simply laser-in-slider. Similarly, the laser chip described herein enhances both surface emitting and edge emitting lasers.

FIG. 1 illustrates a side view of a HAMR apparatus 100 according to an example embodiment. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium, e.g., disk 112. When the slider 102 is located over surface 110 of disk 112, a flying height 114 is maintained between the slider 102 and the surface 110 by a downward force of arm 104. This downward force is counterbalanced by an air cushion that exists between the surface 110 and a media facing surface 103 of the slider 102 when the disk 112 is rotating. It is desirable to maintain a predetermined slider flying height 114 over a range of disk rotational speeds during both reading and writing operations to ensure consistent performance. Heating from HAMR optical components can affect the flying height 114. Example HAMR components that may induce these temperature changes include a laser chip 116, NFT 118, and waveguide 120.

In the example embodiment of FIG. 1, HAMR apparatus 100 includes optical path components (e.g., waveguide 120) that direct light from the laser diode of the laser chip 116 to the recording medium (e.g., disk 112). The NFT 118 allows HAMR apparatus 100 to achieve tiny confined hot spots. In one embodiment, the NFT 118 is designed to reach local surface-plasmon at a designed light wavelength. Additionally, part of the field will tunnel into a storage medium and get absorbed, raising the temperature of the medium locally for recording.

FIG. 2A illustrates an exemplary embodiment of the laser chip 116 from FIG. 1. FIG. 2A is a sectional view of the laser chip 116 that also schematically illustrates an exemplary electrode configuration with three terminals. In the exemplary embodiment, the laser chip 116 includes a laser diode 202 and a photodetector 204 monolithically integrated onto one laser chip. Laser chip 116 additionally includes a p-region 206, an n-region 208, a single active region 210, a front facet 212, and a rear facet 214. The n-region 208 includes a n-contact 216 and semiconductor layers 218. The p-region 206 includes p-contact 220 for the laser diode 202, an p-contact 222 for the photodetector 204, semiconductor layers 224 and a cladding 225.

In the embodiment of FIG. 2A, the laser diode 202 is fabricated on the same chip as the photodetector 204 in a manner such that an optical cavity 226 of the chip is uninterrupted and is used for both the laser diode 202 as well as the photodetector 204. In the exemplary embodiment, laser diode 202 is forward biased with a connection to an anode terminal 228 at p-contact 220. Photodetector 204 is reverse biased with a connection to cathode terminal 230 at p-contact 222. The n-contact 216 for both laser diode 202 and photodetector 204 is connected to ground 232. P-contacts 220 and 222 are segregated from one another by a feature 234 such as a trench/gap. Thus, feature 234 separates (i.e. interrupts) connection between p-contact 220 and p-contact 222.

In FIG. 2A, laser diode 202 and photodetector 204 share the same active region 210, which is disposed between the p-region 206 and the n-region 208. The active region 210 is continuous (i.e. uninterrupted) in extent. The feature 234 does not have sufficient height (i.e. depth in the direction measured by dimension H) to extend into and separate active region 210 or cladding 225. Thus, the feature 234 does not have sufficient height to interfere with the quantum wells or impinge upon cladding 225. However, in the exemplary embodiment the feature 234 does have sufficient height to extend through semiconductor layers 224 adjacent to cladding 225 Semiconductor layers 218 and 224 are disposed adjacent the active region 210. The front facet 212 and the rear facet 214 are disposed on opposing ends of the laser chip 116.

In one embodiment, the laser chip 116 comprises, for example, a semiconductor injection laser with a gallium arsenide, indium gallium arsenide, aluminum gallium arsenide active region 210. In one embodiment, laser chip 116 has a total height H of 100 μmeters, a total width (dimension not shown in FIG. 2A) of 100 μmeters, and a total length L of between about 100 to 500 μmeters. In one embodiment, the feature 234 has a height of 0.1 to about 10 μmeters, a width that can match the width of contact (e.g., 3 to 10 μmeters), and a length of 0.1 to 10 μmeters. Thus, the first feature can have a height of between about 0.001 to about 0.1% of a total height H of the laser chip 116. In some embodiments, the feature 234 can have a length of between about 0.0002 and about 0.1% of a total length L of the laser chip. A length of the photodetector 204 can be between 5% to 10% of a length of the laser diode 202. Thus, the photodetector 204 comprises a smaller section of the laser chip 116 than the laser diode 202.

The laser chip 116 may be fabricated using solid state batch processing on a larger wafer scale, and after processing the wafer may be diced or otherwise subdivided into a multitude of smaller devices, one of which is the laser chip 116. The semiconductor layers 218 may be the diced portion of an initial crystalline wafer on which a plurality of thin layers 114 (e.g., layers whose thicknesses are on the order of about one micron or less) are grown, deposited, and/or patterned on a side of the wafer using, for example, photolithography and chemical, plasma, or other etching processes. Feature 234 can be created during an under bump metallization (UBM) process using lithography or etching, for example. Although shown in reference to a dual sided laser, the techniques disclosed herein are also applicable to a single sided laser.

Figure 2B:
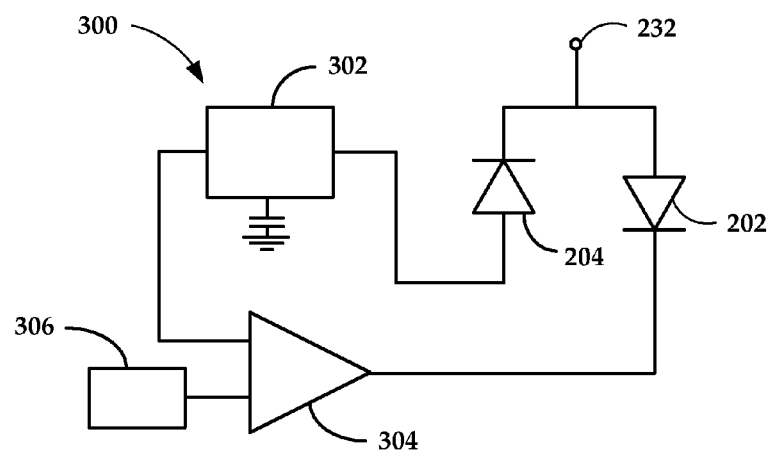
FIG. 2B is circuit diagram of one embodiment of a circuit that can be used with the laser chip of FIG. 2A.

FIG. 2B shows a high level circuit diagram of one embodiment of a circuit 300 that can be used with the three terminal arrangement and laser chip 116 of FIG. 2A. In FIG. 2B, a low pass filter 302 is electrically connected to the photodetector 204 as well as a driver 304. The driver 304, such as a comparator, is provided (connected to bias 306) and is electrically connected to the photodetector 204. The photodetector 204 and the laser diode 202 are electrically connected to ground 232, as previously discussed.

Figure 3:
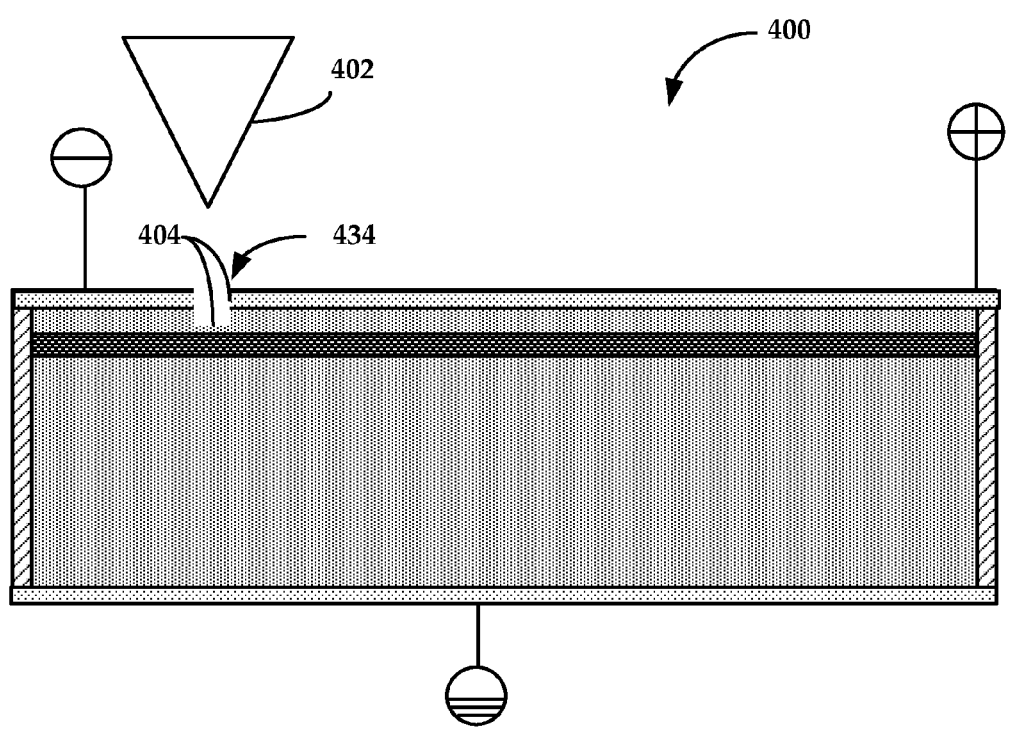
FIG. 3 is a cross-sectional view of a particle emitting device and a laser chip according to another exemplary embodiment.

FIG. 3 illustrates another exemplary embodiment of a laser chip 400. Laser chip 400 is constructed and operates in a manner similar to laser chip 116 described in reference to FIG. 2A. However, the embodiment of FIG. 3, additionally includes a device 402 capable of bombarding the surfaces 404 of feature 434 with particles such as ions or photons in order to increase the resistance along the surfaces 404. Additionally, surfaces 404 can be treated with a combination of passivation of the top semiconductor layer and oxidation of the top electrode in the etched 234 region to increase the resistance therealong. These and other applicable processes should avoid introduction of defects to the cladding 225 and quantum wells of active region 210.

Figure 4A:
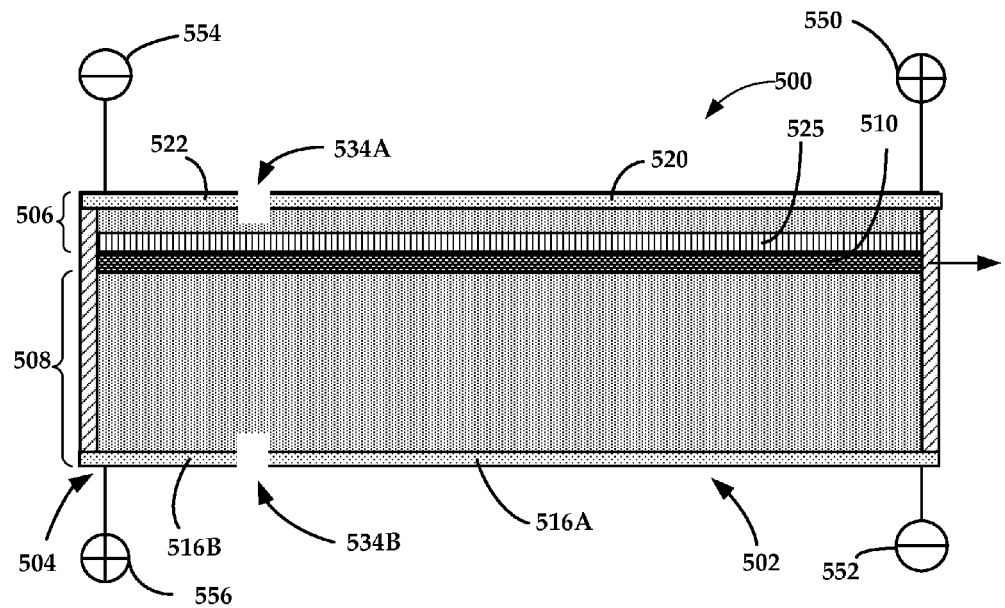
FIG. 4A is a cross-sectional view of a laser chip according to another exemplary embodiment.

FIG. 4A illustrates another embodiment of a laser chip 500 that schematically illustrates an exemplary electrode configuration with four floating terminals. Laser chip 500 is constructed and operates in a manner similar to laser chip 116 described in reference to FIG. 2A. However, in FIG. 4A both the n-contact and p-contact of the laser diode and photodetector are separated by first feature 534A and second feature 534B. In particular, n-contact is now separated into a n-contact 516A for the laser diode 502 and a n-contact 516B for the photodiode 504. Thus, n-contacts 516A and 516B are segregated from one another by the second feature 534B, which can comprise for example a trench/gap in the n-contact and other layers of the laser chip 500. Similarly, the p-contact 520 for the laser diode 502 is segregated from the p-contact 522 of the photodiode 504 by the first feature 534A.

In the exemplary embodiment of FIG. 4A, laser diode 502 is forward biased with a connection to an anode terminal 550 at the p-contact 520 and a connection to a cathode terminal 552 at the n-contact 516A. Photodetector 504 is reverse biased with a connection to a cathode terminal 554 at an p-contact 522 and a connection to an anode terminal 556 at the n-contact 516B.

In FIG. 4A, laser diode 502 and photodetector 504 share the same active region 510, which is disposed between the p-region 506 and the n-region 508. The active region 510 as well as the cladding 225 in the p-region 506 is continuous (i.e., uninterrupted) in extent. The features 534A and 534B do not have sufficient depth to extend into and separate active region 510 and/or cladding 225. The features 534A and 534B do not interfere with the cladding or quantum wells of the laser chip 500.

Figure 4B:
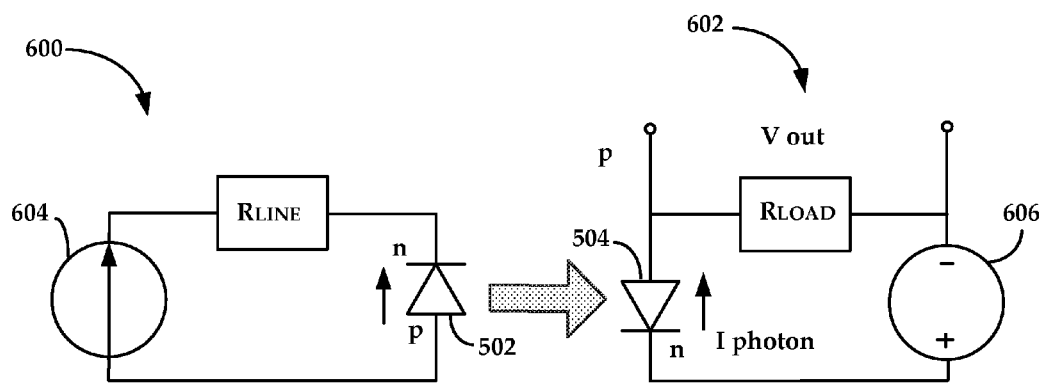
FIG. 4B are circuit diagrams of exemplary embodiments of circuits that can be used with the laser chip of FIG. 2A.

FIG. 4B shows a high level circuit diagrams of embodiments of a circuits 600 and 602 that can be used with the floating four terminal arrangement and laser chip 500 of FIG. 4A. As shown in the circuits 600 and 602, the laser diode 502 and the photodetector 504 are independently driven by a current source 604 and a voltage bias 606, respectively. The floating terminal arrangement described with reference to FIGS. 4A and 4B may be used in instances where a pulsed mode of operation is used in order to electrically isolate the laser diode 502 from the photodetector 504.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
a body;
a read/write element disposed on the body and configured to apply a magnetic field to write data on a portion of a heat-assisted magnetic recording media in response to an energizing current; and
a laser chip comprising:
a laser diode having an active region configured to produce light, the laser diode adapted to inject the light proximate the read/write element; and
a photodetector sharing an active region that is continuous with the active region of the laser diode, the photodetector adapted to monitor light from the laser diode, wherein the laser diode and photodetector are integrated together on the same laser chip.

2. The apparatus of claim 1, wherein the laser chip includes an electrode pair, and wherein one of the electrode pair is reverse biased to form the photodetector.

3. The apparatus of claim 1, the laser chip includes an electrode pair, and wherein one of the electrode pair is forward biased to form the laser diode.

4. The apparatus of claim 3, wherein the photodetector comprises a smaller section of the laser chip than the laser diode.

5. The apparatus of claim 1, wherein a length of the photodetector is between 5% to 10% of a length of the laser diode.

6. The apparatus of claim 1, wherein the laser chip has a first feature that separates the laser diode from the photodetector, and wherein the first feature does not extend into an active region and/or a top waveguide cladding.

7. The apparatus of claim 1, wherein the laser chip has a first feature that separates the laser diode from the photodetector, and wherein the first feature is formed in a p-region portion of the laser diode and extends through semiconductor layers 8. The apparatus of claim 1, wherein the laser chip has a first feature that separates the laser diode from the photodetector, and wherein the first feature has a height of between 0.001 and 0.1% of a total height of the laser chip.

9. The apparatus of claim 1, wherein the laser chip has a first feature that separates the laser diode from the photodetector, and wherein the first feature has a length of between 0.0002 and 0.1% of a total length of the laser chip.

10. The apparatus of claim 1, where the laser chip comprises a four terminal device and has a first feature and a second feature that separate the laser diode from the photodetector.

11. The apparatus of claim 6, wherein the laser chip has a treatment that increases a resistance along the first feature.

12. The apparatus of claim 1, wherein an optical cavity of the laser chip is part of the photodetector as well as the laser diode.

13. The apparatus of claim 6, wherein the first feature is a trench.

14. An apparatus comprising:
a body;
a write element disposed on the body and configured to apply a magnetic field to write data on a portion of a heat-assisted magnetic recording media in response to an energizing current; and
a laser chip with segregated first and second contacts, wherein the first contact is reverse biased as a detector and the second contact is forward biased as a laser diode, wherein the detector is monolithically fabricated to have an active region that is continuous with an active region of the laser diode such that a first trench feature does not separate the active regions of the detector and laser diode.

15. The apparatus of claim 14, wherein the laser chip comprises a four terminal device and has the first feature and a second feature.

16. The apparatus of claim 14, wherein an optical cavity of the laser chip is part of the photodetector as well as the laser diode.

17. The apparatus of claim 14, wherein a length of the detector is between 5% to 10% of a length of the laser diode.

18. A method comprising:
providing a monolithically integrated laser chip having one contact reverse biased as a photodetector and a second contact forward biased as a laser diode, the photodetector having an active region that is continuous with an active region of the laser diode;
generating laser light from the laser diode;
coupling the laser light into an optical path having a distal end;
directing a first portion of the laser light toward a near field transducer located at the distal end, the first portion of laser light exciting the near field transducer to surface plasmonic resonance;
sensing the laser light to monitor an output power of the laser diode; and
applying an energizing current to a write element to write data to a portion of a media.

19. The method of claim 18, wherein the laser chip has a first feature that does not extend into and separate the active regions.

20. The method of claim 19, further comprising bombarding the first feature with at least one of ions or photons to increase resistance along the first feature.

* * * * *